United States Patent
Henry et al.

(10) Patent No.: US 12,052,652 B2
(45) Date of Patent: *Jul. 30, 2024

(54) WIRELESS DYNAMIC FILE EXCHANGE

(71) Applicant: Cisco Technology, Inc., San Jose, CA (US)

(72) Inventors: Jerome Henry, Pittsboro, NC (US); Sudhir K. Jain, Fremont, CA (US); Malcolm Muir Smith, Richardson, TX (US)

(73) Assignee: Cisco Technology, Inc., San Jose, CA (US)

( * ) Notice: Subject to any disclaimer, the term of this patent is extended or adjusted under 35 U.S.C. 154(b) by 306 days.

This patent is subject to a terminal disclaimer.

(21) Appl. No.: 17/453,732

(22) Filed: Nov. 5, 2021

(65) Prior Publication Data

US 2022/0060976 A1 Feb. 24, 2022

Related U.S. Application Data

(63) Continuation of application No. 16/749,767, filed on Jan. 22, 2020, now Pat. No. 11,184,839.

(60) Provisional application No. 62/852,475, filed on May 24, 2019.

(51) Int. Cl.
| | |
|---|---|
| *H04W 48/16* | (2009.01) |
| *H04L 9/40* | (2022.01) |
| *H04W 28/24* | (2009.01) |
| *H04W 48/14* | (2009.01) |
| *H04W 74/0816* | (2024.01) |

(52) U.S. Cl.
CPC ......... *H04W 48/16* (2013.01); *H04L 63/0428* (2013.01); *H04W 28/24* (2013.01); *H04W 48/14* (2013.01); *H04W 74/0816* (2013.01)

(58) Field of Classification Search
CPC ..... H04W 48/16; H04W 28/24; H04W 48/14; H04W 74/0816; H04W 76/20; H04W 84/12; H04L 63/0428; H04L 67/30
See application file for complete search history.

(56) References Cited

U.S. PATENT DOCUMENTS

| | | | | |
|---|---|---|---|---|
| 11,184,839 B2* | 11/2021 | Henry | ............... | H04W 74/0816 |
| 2016/0266925 A1* | 9/2016 | Wei | ......................... | H04L 67/60 |
| 2017/0027006 A1* | 1/2017 | Vikberg | .............. | H04W 12/069 |

* cited by examiner

*Primary Examiner* — Afshawn M Towfighi
(74) *Attorney, Agent, or Firm* — Patterson + Sheridan, LLP

(57) ABSTRACT

Wireless dynamic file exchange is provided by, in response to a triggering network condition occurring, initiating an exchange of a parameter file including non-layer two content via a 802.11 message, such as a Generic Advertisement Service (GAS) message between an access point (AP) and a station (STA) connected to the AP; and in response to determining that the exchange was unsuccessful, terminating a connection between the AP and the STA. The parameter file may be sent over several messages and update the parameters for a new session or an existing session. Devices that do not conform to the updated parameters may be disassociated from the AP and re-connect to receive and implement the updated parameters.

20 Claims, 5 Drawing Sheets

WIRELESS DYNAMIC FILE EXCHANGE

CROSS-REFERENCE TO RELATED APPLICATIONS

This application is a continuation of co-pending U.S. patent application Ser. No. 16/749,767, filed Jan. 22, 2020, which claims benefit of U.S. provisional patent application Ser. No. 62/852,475, filed 24 May 2019. The aforementioned related patent applications are herein incorporated by reference in their entireties.

TECHNICAL FIELD

Embodiments presented in this disclosure generally relate to file exchange over wireless communications standards. More specifically, embodiments disclosed herein allow for data exchange of relevant portions of a layer seven (L7, also referred to as the Application Layer) file (rather than an entire file) to manage further data exchange. Thereby, the push/pull of L7 data can be used as a gating condition for ongoing service in a wireless network.

BACKGROUND

Wireless clients use software functions that define network behavior. For example, rate shifting logic is defined by low-level network interface card (NIC) driver functions (therefore, by software). Similarly, application Quality of Service (QoS) marking (differentiated services code point (DSCP), user priorities (UP)) is defined in the network stack (DSCP) and NIC driver (DSCP to UP mapping), respectively (therefore again, in software).

In many scenarios, the network may require a client to modify the software-based behavior to match the requirements of the network. For example, network analytics may indicate that the default rate shifting logic on the client is not optimal for the local network parameters. Similarly, a specific application differentiated treatment profile (designating which application should receive which QoS marking) may need to be pushed to the station (STA), which may also be referred to as User Equipment, endpoint, or the client (device).

One approach is to directly push individual values to the STA. However, this method is limited to layer two (L2, also referred to as Data Link Layer) functions such as timers and the like. Another approach is for the infrastructure to perform a security posture redirect at connection time. However, this method suffers from several limitations. One limitation is that the infrastructure cannot trigger posture updates based on evolving network conditions. For example, performing a posture redirect at connection time does not allow an access point (AP) to request an update postures for the STA when network timers are sub-optimal for the local network conditions after the STA has already successfully connected. Additionally, different APs of the network may require different sets of software settings for the same connected and roaming STA. Another limitation is that setting the posture at connection time requires individual STA evaluation and individual user identification (e.g., according to IEEE 802.1X/EAP). In contrast, software functions may apply to local APs, irrespective of the STA or user identity (e.g., open or PSK-based (public shared key) service set identifiers (SSIDs)).

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
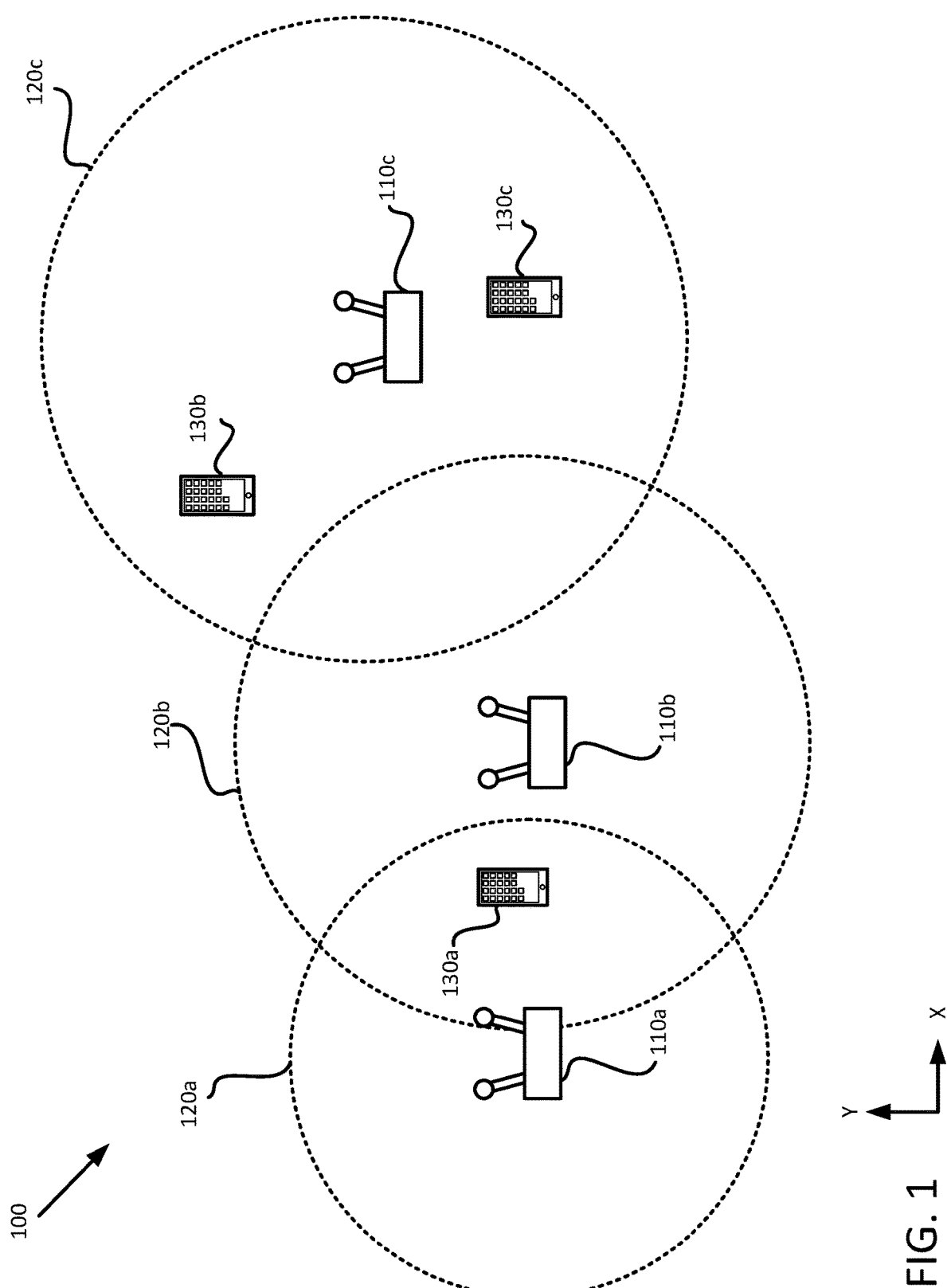
FIG. 1 illustrates an example networking environment, according to embodiments of the present disclosure.

One embodiment presented in this disclosure is a method that includes: in response to a triggering network condition occurring, initiating an exchange of a parameter file including non-layer two content via a Generic Advertisement Service (GAS) 802.11 message between an access point (AP) and a station (STA) connected to the AP; and in response to determining that the exchange was unsuccessful, terminating a connection between the AP and the STA.

One embodiment presented in this disclosure is a system that includes: a processor; a communication interface; and a memory storage device including instructions that when performed by the processor enable the system to perform an operation comprising: in response to a triggering network condition occurring, initiating an exchange of a parameter file including non-layer two content via a 802.11 message between an access point (AP) and a station (STA) connected to the AP; and in response to determining that the exchange was unsuccessful, terminating a connection between the AP and the STA.

One embodiment presented in this disclosure is a memory storage device including instructions that when performed by a processor enable the processor to: in response to a triggering network condition occurring, initiate an exchange of a parameter file via a Generic Advertisement Service (GAS) message between an access point (AP) and a station (STA) connected to the AP; and in response to determining that the exchange was successful, maintain the connection between the STA and the AP according to new configuration data included in the parameter file.

Example Embodiments

The present disclosure provides a gating mechanism by which a network can determine whether to persist or terminate a connection with a given STA through the transfer and automatic provisioning of configuration settings. Advantageously, different APs in the network can alter an initially configured connection profile when a STA is handed off to a new AP in the network or as network conditions change (while remaining connected to an initial AP).

As described herein, the network infrastructure (e.g., APs) directly request bundled STA changes through a general software update function to the STAs, which are then redistributed to the relevant layers. In some embodiments, which can be used for various types of gating data exchanges, parameters or a L7 file are exchanged between an STA and the APs. Doing so ensures that a push/pull of L7 data can be used as a gating condition for the continuation/termination of a connection with an STA, or to allow for different levels of ongoing service (e.g., 11v Basic Service Set (BSS) transition exchanges) according to updated QoS parameters. Further, IEEE 802.11 exchanges can be leveraged to allow the APs and the STA to communicate a need to update some STA software parameters. In some embodiments, these exchanges can be used to dynamically push a new QoS whitelist to the STA, thus extending the on-connection application differentiated treatment profile mechanism, for which the profile was pushed before associating the STA and AP. However, in general, this mechanism can be used to push any set of new parameters to the STA, in the form of individual parameters (at or beyond L2) or a container file (e.g., a driver update). This mechanism can also be used to retrieve a set of parameters from the STA (e.g., retrieving Long Term Evolution (LTE) cellular connection data over a prior interval, along with location).

FIG. 1 illustrates an example networking environment 100, according to embodiments of the present disclosure. In the networking environment 100, three APs 110a-c (generally, AP 110) provide three corresponding ranges 120a-c (generally, range 120) within a wireless network. Several client devices, referred to herein as STA 130a-c (generally, STA 130), are shown moving through the network environment 100, and may transition from receiving service from one AP 110 to another AP 110 as the STA 130 move within or out of the corresponding ranges 120 in the network.

The APs 110 may include various networking devices configured to provide wireless networks according to various networking standards or Radio Access Technologies (RAT) (e.g., IEEE 802.11 or "WiFi" networks, BLUETOOTH® networks, "cellular" (including various generations and subtypes thereof, such as Long Term Evolution (LTE) and Fifth Generation New Radio (5G NR)) networks, Citizens Broadband Radio Service (CBRS) networks, proprietary networks). Example hardware as may be included in an AP 110 is discussed in greater detail in regard to FIG. 5.

The networking environment 100 is illustrated according to the collective ranges 120 of the AP 110 disposed in the environment. The APs 110 offer the various STAs 130 within the corresponding ranges 120 network connectivity for various services including voice communication (e.g., telephony services), text communication (e.g., paging functionality, short message service (SMS), multimedia message service (MMS)), and data transmission (e.g., wireless internet access). In various embodiments, the ranges 120 may represent individual networks or may represent different nodes of a shared network.

Each of the APs 110 may be provided by different entities in a shared public space and/or may set different rules for how devices are to interact in the networking environment 100. For example, a STA 130 connected to a first AP 110a may be allowed or required to act differently than when that same STA 130 is connected to a second AP 110b in the same network. In some aspects, two APs 110 in the same network may have different whitelists for services that a STA 130 can connect to, different configuration settings, or the like. For example, an AP 110 located in a busy intersection that expects multiple STAs 130 to connect for short periods of time (e.g., while transiting to a destination) may limit the QoS for connected STAs 130 to thereby accommodate more STAs 130 at a given time than compared to an AP 110 located in a secluded location where STAs 130 are expected to remain stationary for longer periods of time.

The STA 130 may include any computing device that is configured to wirelessly connect to one or more APs 110 in the networking environment 100. Example STAs 130 can include, but are not limited to: smart phones, feature phones, tablet computers, laptop computers, desktop computers, Internet of Things (IoT) devices, and the like. Example hardware as may be included in a STA 130 is discussed in greater detail in regard to FIG. 5.

At a high level, the STAs 130 exchange frames with the APs 110 to send/receive configuration settings and logs for the network. In one embodiment, the AP 110 automatically exchanges the configuration settings or logs that the STA 130 needs to establish/maintain a connection with that AP 110, thus dynamically expressing (i.e., with values that may change over time) networking restrictions to a STA 130 for a particular application (e.g., a web browser, telephony application, conferencing application, email application, game, or any other software requesting/receiving data over a network with the AP 110). Additionally, a Mobile Device Management (MDM) device or solution can send configuration settings to a STA 130, inline or offline or without auto-provisioning depending on administrator preferences, thus allowing the networking infrastructure (i.e., the APs 110—not the MDM server/solution) to change all or a part of the ruleset on the STA 130, thus resulting in conditions that are specific to that STA 130 at that point in time and space. Stated differently, the APs 110 can control which STAs 130 remain connected to the network and how those STAs 130 behave while connected to the network on the fly in response to changes in local conditions observed by the STA 130 and/or the AP 110.

In various embodiments, the local conditions and criteria are based on criteria local to the wireless network (not just based on an enterprise general policy), the position of the device in the network (signal level, form factor, etc.), the locations of neighboring APs 110, number of devices connected to the network, available bandwidth in the network, etc., although enterprise level policies (e.g., blocking certain applications, allowing access to certain services/sites, etc.) can also be included in the configuration and profile information in some embodiments.

The profiles can dictate various behaviors of a given STA 130 while associated with or connected to a given AP 110, such as, for example, various QoS levels allowed for individual applications running on the STA 130; whitelists or blacklists for various features, applications, or service providers; device driver settings; etc.

In one embodiment, the profile can be exchanged as early in the connection as at association time (i.e., after association has happened). At that time, the AP 110 to STA 130 relationship is either to be encrypted (in which case the profile exchange, following unicast frame processes, is also encrypted) or Open. If the network is open, then no data exchanged between the AP 110 and the STA 130 are encrypted, and all of the data transmitted are visible and exposed. In some embodiments, the AP 110 pushes a profile to the STA 130 at the earliest possible opportunity without user intervention (i.e., without the need for a user to click a link, separately submit credentials, etc.), and can repeatedly push a new profile whenever needed or in response to an update or change in the criteria of the network. As such, the present disclosure provides a mechanism that not only provides an element of automation, but also a choreography where the success of the exchange is verified. For example, after a STA 130 receives and applies a profile, the AP 110 notices the STA 130 behaving as directed in the new profile, whereas if the STA 130 does not receive (or receives and does not apply) the profile, the AP 110 can also notice the noncompliant behavior and may take remedial action as necessary (e.g., dropping the STA 130 from the network).

In one embodiment, the configuration only applies to the current SSID and L2 session/connection. For example, when a STA 130 enters a mall, stadium, campus, or other public space with an available network, the STA 130 can receive the policy from the AP 110 for that network's SSID/WLAN, but the rules may change as the user walks around to different locations in the public space served by different APs 110 or as time progresses and networking conditions change. These rules cease to be applied and are removed from the STA 130 when the STA 130 disconnects from the SSID/WLAN. Stated differently, the rules are not installed 'forever' on the STA 130; the rules are just applied during the session in which the rules are appropriate and/or required by a given AP 110 to which the STA 130 is connected. In various embodiments, the configuration file/parameters are received by the 802.11 device driver on the STA 130 and stored in local RAM (i.e., non-persistent storage) on a per SSID/WLAN basis in the Wi-Fi connection cache of the STA 1130 and replaced in memory by updates received for the same SSID/WLAN. Accordingly, this configuration only persists for the duration of an association/disassociation cycle and does not survive device resets, etc. In some embodiments, the rules are defined per SSID and BSSID so that the rules can be updated as the STA 130 moved from one AP 110 to another. In some embodiments, the rules are defined temporally and locally, so that the AP 110 can update the rules during a single session at various times. This temporary rule set mitigates any form of synchronization, segment tracking or versioning problems prevalent in other forms of "file download" and minimizes message exchanges during all of the critical association processes.

Figure 2:
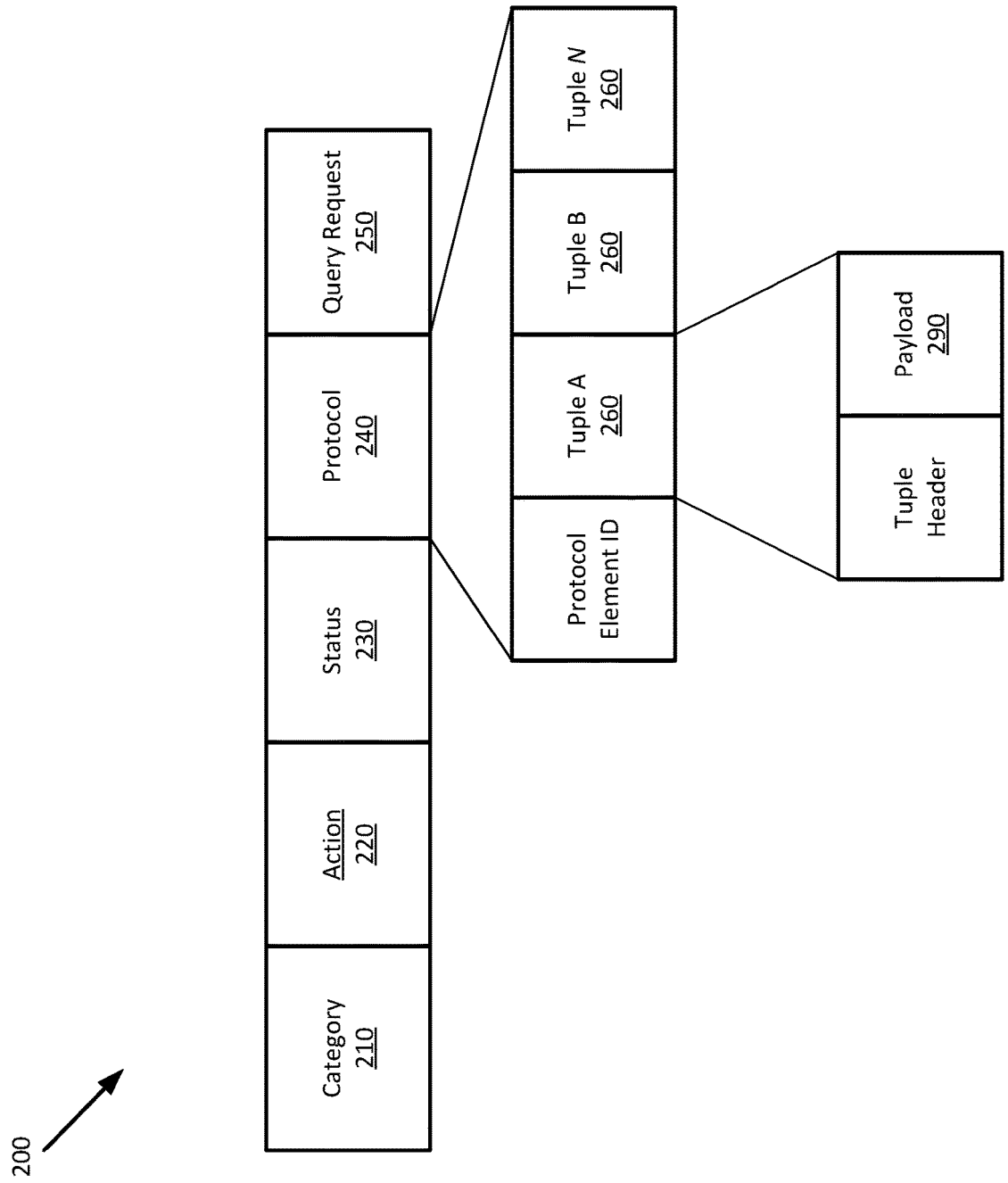
FIG. 2 illustrates a field delineation of messages sent between an Access Point and a Station, according to embodiments of the present disclosure.

FIG. 2 illustrates a field delineation of an 802.11 message 200 (generally, message 200) sent between an AP 110 and a STA 130, according to embodiments of the present disclosure. The message 200 can be a GAS (Generic Advertisement Service) message that transports an Access Network Query Protocol Message (ANQP) to provide information about the network that the AP 110 is a part of and that the STA 130 seeks to connect to (or remain connected to), although the present disclosure contemplates various other types of frames as possible for transmitting messages for auto-provisioning (e.g., Cisco Compatible eXtension (CCX) exchange, data frame with specific flag or Information Element (IE) identified by the other side as an exchange marker, etc.). The message 200 carries non-layer 2 (non-L2), which may include parameter files and other payloads associated with different networking layer data.

A message 200 from the STA 130 to the AP 110 can request additional/updated parameters or indicate that the STA 130 is capable of receiving updated parameters, according to the present disclosure. In some embodiments, the STA 130 indicates that the message 200 is expected to be a public or a protected/private action frame (e.g., in a category field 210 of the message 200) and that the message 200 is transmitted in an initial request format or in a comeback request format (e.g., in an action field 220 of the message 200). The message 200 includes data to transmit to the AP 110 as a piggybacked payload 290 (e.g., in a protocol field 240 of the message 200 as part of a protocol tuple 260) that uses a vendor-specific format and that requests a response from the AP 110 (e.g., in a query request field 250 of the message 200).

A message 200 from the AP 110 to the STA 130 can communicate parameter information for the network and respond to the STA 130 to indicate that future updates may be pushed to the STA 130 from the AP 110, according to the present disclosure. In some embodiments, the AP 110 indicates that the message 200 is expected to be a public or private/protected action frame (e.g., in a category field 210 of the message 200) and that the message 200 is transmitted in an initial response format or in a comeback response format (e.g., in an action field 220 of the message 200) and indicates that a request message 200 from the STA 130 was (or was not) successfully received (e.g., in a status code field 230). The message 200 includes data to transmit to the STA 130 as a piggybacked payload 290 (e.g., in a protocol field 240 of the message 200 as part of a protocol tuple) that uses a vendor-specific format and that requests a response from the AP 110 (e.g., in a query request field 250 of the message 200).

Although not illustrated, the message 200 can include other fields, such as, for example, response delay fields, dialog tokens, length fields, checksum fields, and the like. Additionally, the values held in the various fields, the relative positions in the message 200 of the various fields, and the sizes/lengths of the various fields may differ between various embodiments based on the standard or protocol used for communicating between the AP 110 and the STA 130

Figure 3:
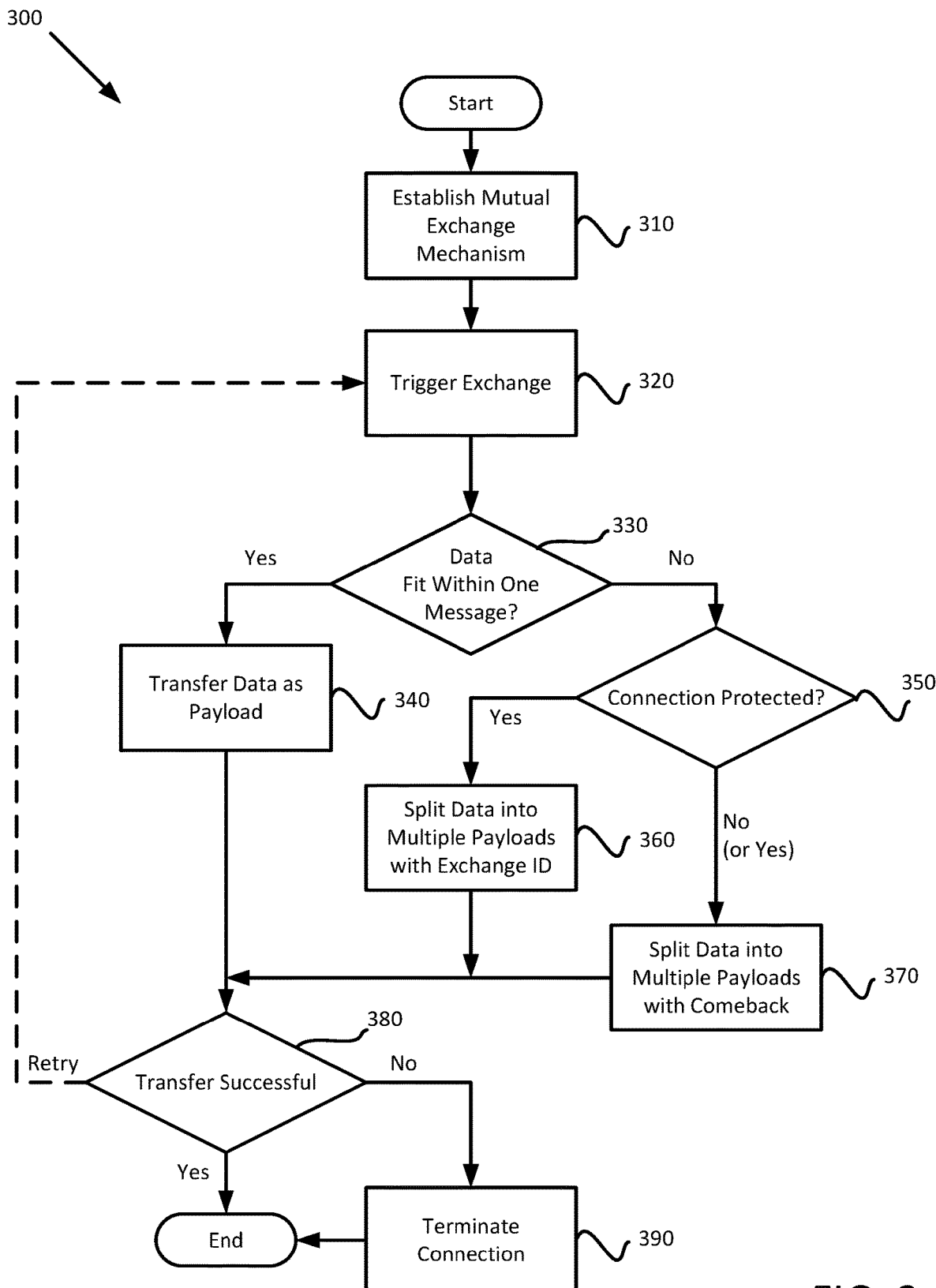
FIG. 3 is a flowchart of a method, according to embodiments of the present disclosure.

FIG. 3 is a flowchart of a method 300, according to embodiments of the present disclosure. Method 300 optionally begins at block 310, where the AP 110 and the STA 130 use a negotiated mutual identification mechanism that enables both the AP 110 and the STA 130 to know that a later exchange may potentially be needed/requested in the currently provided network. In one embodiment, the STA 130 uses a STA-side specific IE to signal support for the features enabled by auto-provisioning and later exchanges (e.g., through specific messages, or specific bits (e.g., extension bits) or fields in upstream frames). For example, extension bits can be used for mutual recognition between the STA-side IE and the AP-side IE. In another embodiment, specific bits in the AP-side IE and in the STA-side specific IE can also be used to trigger the exchange. This phase can help identify subsets of devices that may use or rely on the exchange. Block 310 is optional and may be omitted in some embodiments, as the exchange process is individual to a given STA-AP connection, and some embodiments of method 300 may therefore begin instead with block 320.

At block 320, the STA 130 triggers an exchange in response to detecting specific triggering conditions. For example, the triggering conditions can be a new association or roaming to a new BSSID, a WiFi failure rate beyond target threshold, or the like. The STA 130 can also communicate various thresholds to the AP 110 for the AP 110 to observe as triggering conditions on behalf of the STA 130 (e.g., network congestion rates). In some embodiment, the STA 130 provides information about the hardware, software, or user of the STA 130 to the AP 1110, and identification or authentication of which can act as a triggering condition (e.g., recognizing a user type or trusted hardware associated with privileged access, recognizing a deprecated software version associated with restricted access). In response to detecting the triggering conditions, the STA 130 uploads or downloads a set of parameters or a file to/from the AP 110 (that the STA 130 is currently connected to) in a message 200. In various embodiments, the exchange request can occur at association time, at roaming time, or can be triggered by either side (STA 130 or AP 110) at any point of the association phase or during the session. In one embodiment, the AP/wireless LAN controller (WLC) can gate a STA's continued association with a file exchange. For example, association continues only if a QoS whitelist is pushed to the STA 130; or, WiFi exchange will be allowed only if the STA 130 uploads LTE connection parameters to the AP 110. The AP/WLC can contain the file locally, or retrieve it from a server for retransmission to the STA 130. The AP 110 then acts as a proxy between a data retrieving standard technique over the wire (e.g., File Transfer Protocol (FTP)) and L2 exchange of that file over the radio link with the STA 130.

In various embodiments, a request triggered by the STA 130 can include the STA 130 sending a GAS initial request publicly (i.e., unencrypted) or privately (e.g., in a protected mode (i.e., encrypted)). In summary, the query request element carries the request type indicating at least upload/download direction of exchange and a data type to exchange.

At block 330, the STA 130 determines whether the data to be exchanged will be short enough to be contained in a single message to/from the AP 110 or too long to be contained in a single message to/from the AP 110. In various embodiments, the message is the body of a GAS response (as a vendor specific content field), and the threshold amount of data that can be contained therein is 255 octets. When the amount of data is at or below the threshold, method 300 proceeds to block 350. When the amount of data is above the threshold, method 300 proceeds to block 360.

At block 340, when the message 200 can contain all of the data to be exchanged, the message 200 is exchanged with the data included therein. The information included in the message identifies a type of the data being exchanged, a separator, and the payload data. For example, in one embodiment, the data type is set to "QoS whitelist," the separator is a checksum byte, and the payload is the list of application bundle identifiers (IDs) to include in the whitelist for the local SSID (e.g., two bytes per bundle ID). In contrast to other solutions, the STA 130 does not need to transmit the entire profile (e.g., an xml file), but simply the marker of where the data fits (e.g., the QoS section of targeted SSID) in an existing file along with an encoding of the data (e.g., bundle IDs instead of application names). Advantageously, method 300 allows for the transmission of elements that are not L2, including whether these elements have consequences on the L2 behavior. For example, a QoS whitelist is not L2. For example, the content can be a driver update (L7 executable file) that will change the STA 130 L2 behavior.

At block 350, when the data are too long to fit in a single message 200 (e.g., a signal log upload case), the STA 130 determines how to indicate and transmit the data over multiple messages 200 based on network settings including whether the connection is protected (e.g., open versus encrypted). The STA 130 may elect to proceed to block 360 when the messages 200 are protected (i.e., encrypted) or to block 370 when the messages 200 are either open or protected.

At block 360, the STA 130 splits the data into multiple payloads 290 that can each fit into an associated message 200. The payload 290 includes an exchange ID that uniquely identifies the data to be sent (e.g., a size and exchange checksum). One or more data frames follow the initial exchange, either in a burst of several sequential frames or in non-sequential frames (e.g., temporally spaced apart) that each include an associated payload 290 representing a portion of the data to be transferred. The exchange ID value is present in the message 200 and allows the AP 110 to identify which portion of the data a given payload 290 represents.

At block 370, the STA 130 adds a comeback message identifier to the message 200 to signal the need for more frames to transmit all of the data. The comeback exchange is used iteratively (e.g., send, receive confirmation, send next, receive next confirmation, etc.) to complete the exchange until an EndOfFile signal is received.

Method 300 proceeds from blocks 340, 360, and 370 to block 380, where (once the exchange completes) an optional dialog (e.g., a GAS request/response with response with null data type) is transmitted to ensure that the data transfer is completed. When the data transfer is completed successfully, the STA 130 remains connected to the AP 110, and implements the profile information transferred thereto, and method 300 may conclude.

When the data transfer did not complete successfully, one of the AP 110 and the STA 130 can signal the other that the exchange did not complete successfully. An unsuccessful transfer can happen when the local device cannot successfully consume the data received, or because an external device (e.g., a network server) signals that the data received did not fulfil one or more requirements. If the exchange fails, method 300 returns to block 320, where the STA 130 re-attempts the exchange. The STA 130 may re-attempt the exchange up to a predefined number of times (e.g., retry up to X times) before proceeding to block 390, where the connection between the STA 130 and the AP 110 is terminated and method 300 may then conclude. The STA 130 may later attempt to connect to the AP 110, and can then receive the updated parameters at re-association.

Figure 4:
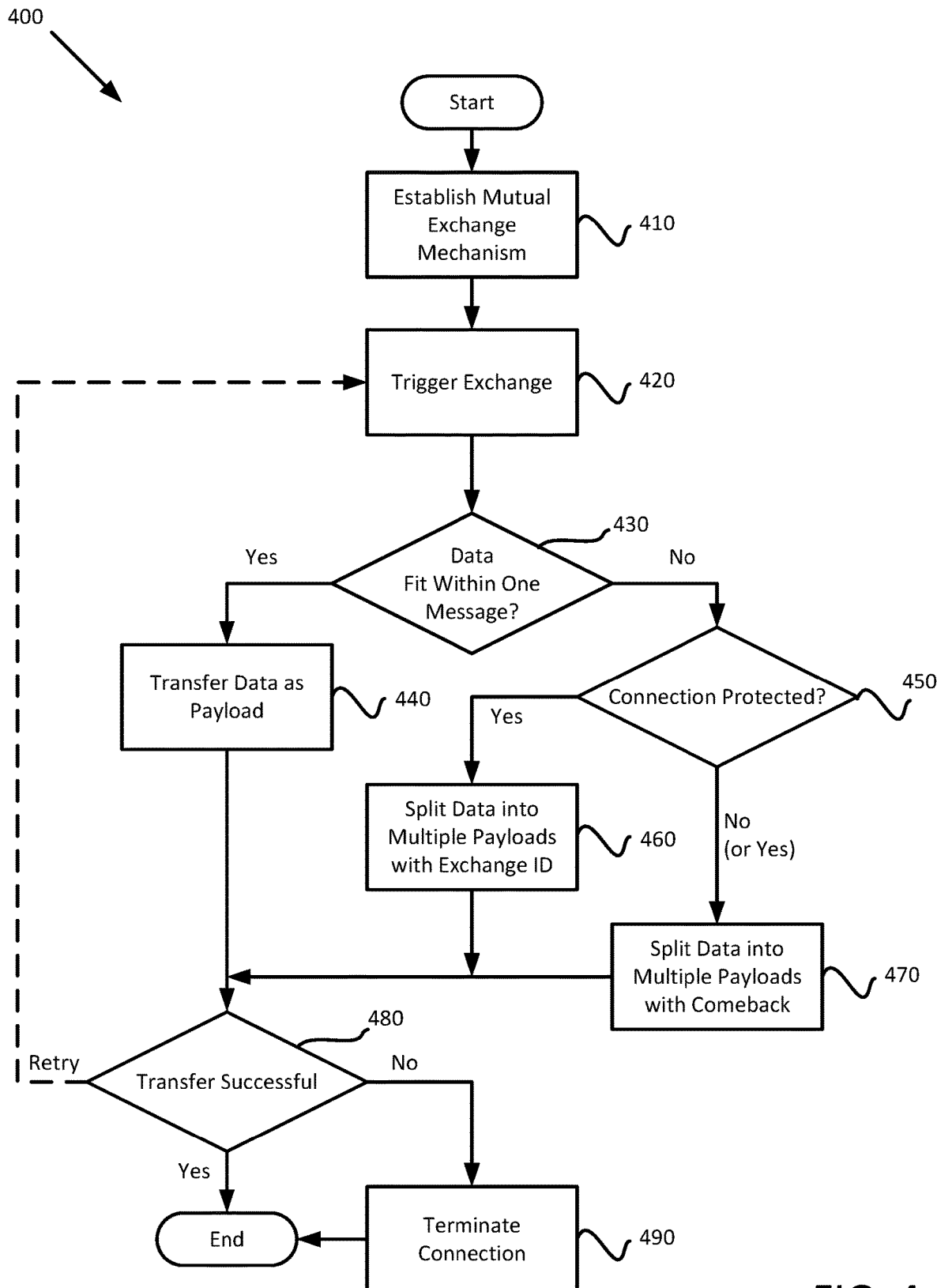
FIG. 4 is a flowchart of a method, according to embodiments of the present disclosure.

FIG. 4 is a flowchart of a method 400 from the perspective of the AP 110 rather than the STA 130 as in method 300, according to embodiments of the present disclosure. Method 400 optionally begins at block 410, where the AP 110 and the STA 130 use a specific mutual identification mechanism that enables both sides to know that a later exchange is potentially needed in the currently provided network. In one embodiment, the AP 110 uses an AP-side specific IE to signal support for the features enabled by auto-provisioning and later exchanges (e.g., through specific messages, or specific bits or fields in downstream frames). For example, extension bits can be used for mutual recognition between the STA-side IE and the AP-side IE. In another embodiment, specific bits in the AP-side IE and in the STA-side specific IE can also be used to trigger the exchange. This phase can help identify subsets of devices that may need the exchange. Block 410 is optional and may be omitted in some embodiments, as the exchange process is individual, and some embodiments of method 400 may therefore begin instead with block 420.

At block 420, the AP 110 triggers an exchange in response to detecting specific triggering conditions. For example, the triggering conditions can be a new association with a new STA 130, a STA 130 with an existing association disconnecting from the AP 110, QoS thresholds reached by or changed by the STA 130 (or an application thereon), the AP 110 recognizing a user type for the STA 130 (e.g., guest versus employee), a length of time for the connection between the AP 110 and the STA 130 (e.g., improve QoS after M minutes, degrade QoS after H hours), or the AP 110 recognizing a STA type or set of characteristics (chipset type, etc.). The AP 110 then requests a push or pull of parameters or a file from the STA 130. The exchange can be an initial exchange or a gating for continuation of the STA 130 association. One advantage here is that a file or parameter (L7) exchange determines the continuation of the L2 session, without the requirement of an external server (e.g., posture) returning a success condition to the network element. Here the infrastructure is independently managing the exchange and the successful conclusion (or failure) thereof. In one embodiment, the AP/WLC can gate the continued association with the STA 130 with a file exchange. For example, association continues only if a QoS whitelist is pushed to the STA 130; or, WiFi exchange will be allowed only if the STA 130 uploads LTE connection parameters to the AP 110. The AP/WLC can contain the file locally to push, or retrieve that file from a server. The AP 110 then acts as a proxy between a data retrieving standard technique over the wire (e.g., FTP) and L2 exchange of that file over the radio link.

When the AP 110 detects a STA 130 requiring a new data exchange phase (e.g., because the STA 130 is initially detected in the range 120 of the AP 110 by probes, the association moves to an association or a request phase), the AP 110 can respond to a query from the STA 130 with a "no data" message 200 if no information is available on the infrastructure side about possible content to push to the STA 130. Alternatively, the AP 110 can respond with a "wait" message 200, while the AP 110 retrieves content to push specifically to the STA 130. In some embodiments, the AP 110 runs a quick identity check on the STA 130, for example because a message received from the STA 130 (e.g., according to method 300 discussed in relation to FIG. 3) identifies a tie to a specific realm (e.g., a publicly accessible profile repository, or a customer-specific profile repository matching the station realm or identity) where profiling for various types of STAs 130 are contained (e.g., either direct content, or association between STA types and content types). This verification may condition the response of the AP 110 ("no data" or content specific to the STA type or returned realm). Additionally, individual user authentication (e.g., Remote Authentication Dial-In User Service (RADIUS)) may also trigger the return of a profile that contains an indication for specific content to push to the STA 130 from the AP 110.

At block 430, the AP 110 determines whether the data to be exchange will be short enough to be contained in a single message to/from the STA 130 or too long to be contained in a single message to/from the STA 130. In various embodiments, the message is the body of a GAS response (as a vendor specific content field), and the threshold amount of data that can be contained therein is 255 octets. When the amount of data is at or below the threshold, method 400 proceeds to block 440. When the amount of data is above the threshold, method 400 proceeds to block 450.

At block 440, when the message 200 can contain all of the data to be exchanged, the message 200 is exchanged with the data included therein. The information included in the message identifies a type of the data being exchanged, a separator, and the payload data. For example, in one embodiment, the data type is set to "QoS whitelist," the separator is a checksum byte, and the payload is the list of application bundle identifiers (IDs) to include in the whitelist for the local SSID (e.g., two bytes per bundle ID). In contrast to other solutions, the AP 110 does not need to transmit the entire profile (e.g., an xml file), but simply the marker of where the data fits (e.g., the QoS section of targeted SSID) in an existing file along with an encoding of the data (e.g., bundle IDs instead of application names). Advantageously, method 400 allows for the transmission of elements that are not L2, including whether these elements have consequences on the L2 behavior. For example, a QoS whitelist is not L2. For example, the content can be a driver update (L7 executable file) that will change the STA 130 L2 behavior.

At block 450, when the data is too long to fit in a single message 200 (e.g., a signal log upload case), the AP 110 determines how to indicate and transmit the data over multiple messages 200. The AP 110 may elect to proceed to block 460 when the messages 200 are protected (i.e., encrypted) or to block 470 when the messages 200 are open or protected.

At block 460, the AP splits the data into multiple payloads 290 that can each individually fit into an associated message 200. The payload 290 includes an exchange ID that uniquely identifies the data to be sent (e.g., a size and exchange checksum). One or more data frames follow the initial exchange, either in a burst of several sequential frames or not (e.g., temporally spaced apart), which each include an associated payload 290 representing a portion of the data to be transferred. The exchange ID value is present in a message 200 and allows the STA 130 to identify which portion of the data a given payload 290 represents.

At block 470, the AP 110 adds a comeback message identifier to the message 200 to signal the need for more frames to transmit all of the data. The comeback exchange is used iteratively (e.g., send, receive confirmation, send next, receive next confirmation, etc.) to complete the exchange until an EndOfFile signal is received.

Method 400 proceeds from blocks 440, 460, and 470 to block 480, where (once the exchange completes) an optional dialog (e.g., a GAS request/response with response with null data type) is transmitted to ensure that the data transfer is completed. Alternatively, one of the AP 110 and the STA 130 can signal the other that the exchange did not complete successfully. This phase can happen when the local device cannot successfully consume the data received, or because an external device (e.g., a network server) signals that the data received did not fulfil one or more requirements. If the exchange fails, method 400 returns to block 420, where the AP 110 re-requests the exchange. Otherwise, method 400 may conclude.

Method 400 proceeds from blocks 440, 460, and 470 to block 480, where (once the exchange completes) an optional dialog (e.g., a GAS request/response with response with null data type) is transmitted to ensure that the data transfer is completed. When the data transfer is completed successfully, the AP 110 maintains the connection with the STA 130, and method 300 may conclude.

When the data transfer did not complete successfully, one of the AP 110 and the STA 130 can signal the other that the exchange did not complete successfully. An unsuccessful transfer can happen when the local device cannot successfully consume the data received, or because an external device (e.g., a network server) signals that the data received did not fulfil one or more requirements. If the exchange fails, method 400 returns to block 420, where the AP 110 re-attempts the exchange. The AP 110 may re-attempt the exchange up to a predefined number of times (e.g., retry up to X times) before proceeding to block 490, where the connection between the STA 130 and the AP 110 is terminated and method 400 may then conclude.

Figure 5:
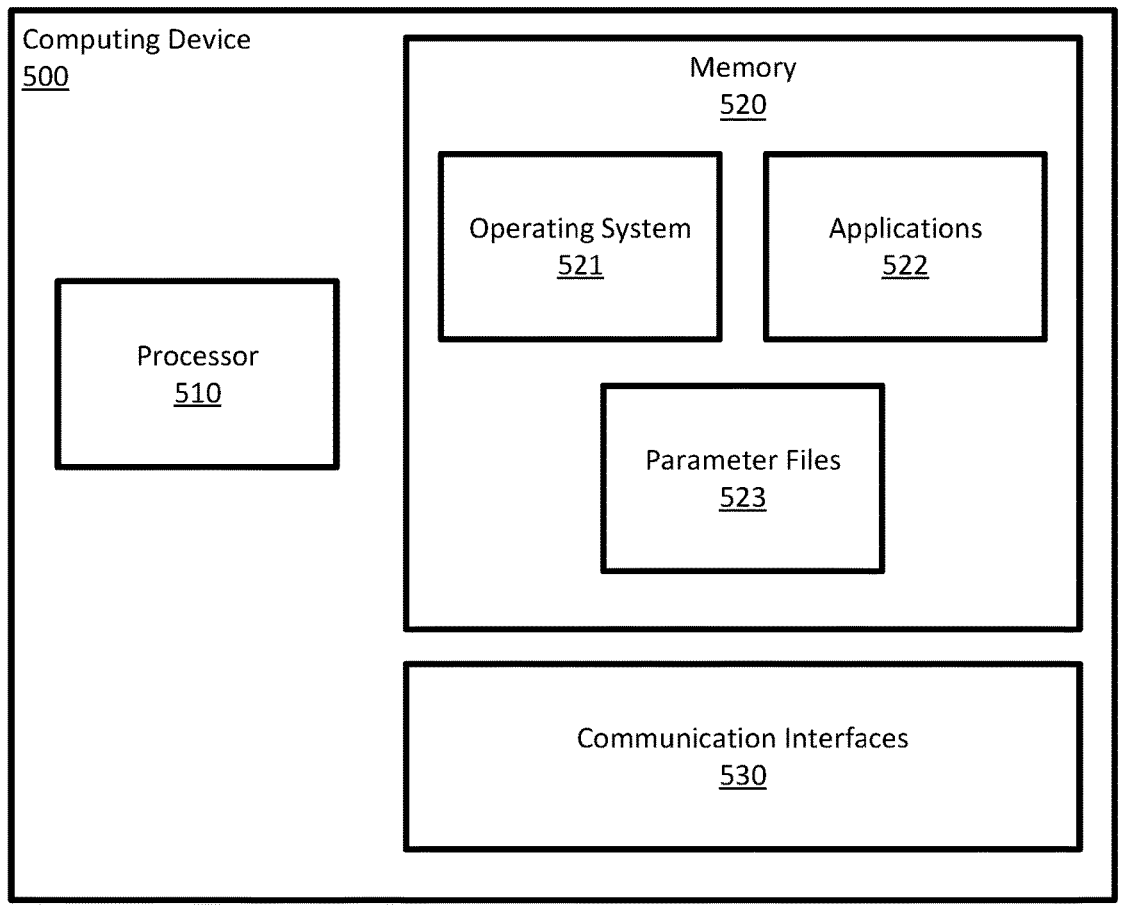
FIG. 5 illustrates hardware of a computing device, according to embodiments of the present disclosure.

FIG. 5 illustrates hardware of a computing device 500, as may be used in an AP 110 or a STA 130 described in the present disclosure. The computing device 500 includes a processor 510, a memory 520, and communication interfaces 530. The processor 510 may be any processing element capable of performing the functions described herein. The processor 510 represents a single processor, multiple processors, a processor with multiple cores, and combinations thereof. The communication interfaces 530 facilitate communications between the computing device 500 and other devices. The communications interfaces 530 are representative of wireless communications antennas and various wired communication ports. The memory 520 may be either volatile or non-volatile memory and may include RAM, flash, cache, disk drives, and other computer readable memory storage devices. Although shown as a single entity, the memory 520 may be divided into different memory storage elements such as RAM and one or more hard disk drives.

As shown, the memory 520 includes various instructions that are executable by the processor 510 to provide an operating system 521 to manage various functions of the computing device 500 and one or more applications 522 to provide various functionalities to users of the computing device 500, which include one or more of the functions and functionalities described in the present disclosure. Additionally, the memory 520 includes one or more parameter files 523 indicating the rules sets that the STA 130 is to use while connected to the AP 110. As will be appreciated, when the parameter files 523 are held in a short term or non-persistent memory (e.g., a RAM device), the parameter files 523 may be updated with relative ease (compared to long term memory or storage), and can be cleared when the memory 520 cycles power, thus mitigating any form of synchronization, segment tracking or versioning problems prevalent in other forms of "file downloads" and minimizing message exchanges during association processes. Additionally, the parameter file 523 that is transmitted can represent a reduced data set from a full parameter file 523 maintained on the AP 110, including just the updated or new configuration data and omitting configuration data that have not changed since the last exchange (i.e., repeated configuration data).

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
    initiating, based on a triggering network condition, an exchange of a parameter file including non-layer two content via an 802.11 message, the parameter file being transferred between an access point (AP) and a station (STA) via an extant connection between the AP and the STA; and
    in response to determining that the exchange of the parameter file was not successful, terminating the extant connection between the AP and the STA.

2. The method of claim 1, wherein the triggering network condition comprises one of:
    a new association with the STA and the AP;
    a second association with a second STA and the AP;
    a disconnecting association with a second STA and the AP;
    a Quality of Service threshold set by the STA being satisfied;
    a Quality of Service threshold set by the AP being satisfied;
    a user type for the STA being identified;
    a length of time for the extant connection between the AP and the STA reaching a time threshold; or
    a type of the STA being recognized by the AP.

3. The method of claim 1, further comprising:
    initiating a second exchange of the parameter file with a second 802.11 message between the AP to a second STA connected to the AP; and
    in response to determining that the second exchange was successful, maintaining a second extant connection between the AP and the second STA according to the parameter file.

4. The method of claim 1, further comprising, in response to determining that the parameter file is too large for transmission via a single Generic Advertisement Service (GAS) message as the 802.11 message and that the extant connection between the AP and the STA is encrypted:
    splitting the parameter file into multiple payloads; and
    transmitting each payload of the multiple payloads in a corresponding GAS message that includes an exchange ID that uniquely identifies a given payload of the multiple payloads.

5. The method of claim 1, further comprising, in response to determining that the parameter file is too large for transmission via a single GAS message as the 802.11 message:
    splitting the parameter file into multiple payloads; and
    transmitting each payload of the multiple payloads in a corresponding GAS message that indicates a comeback response format.

6. The method of claim 1, wherein the parameter file replaces an earlier version of the parameter file in volatile memory of the STA.

7. The method of claim 1, further comprising, before initiating the exchange of the parameter file:
    establishing a mutual exchange mechanism between the AP and the STA to indicate that the STA is capable of receiving new configuration data while remaining connected to the AP.

8. A system, comprising:
    a processor;
    a communication interface; and
    a memory storage device including instructions that when performed by the processor enable the system to perform an operation comprising:
        initiating, based on a triggering network condition, an exchange of a parameter file that does not include layer two content via an 802.11 message, the parameter file being transferred between an access point (AP) and a station (STA) via an extant connection between the AP and the STA; and
        in response to determining that the exchange of the parameter file was not successful, terminating the extant connection between the AP and the STA.

9. The system of claim 8, wherein the operation further comprises:
    before terminating the extant connection, retransmitting the 802.11 message.

10. The system of claim 8, wherein the operation further comprises:
    initiating a second exchange of the parameter file with a second 802.11 message between the AP and a second STA connected to the AP; and
    in response to determining that the second exchange was successful, maintaining a second extant connection between the AP and the second STA according to the parameter file.

11. The system of claim 8, wherein the operation further comprises:
    in response to determining that the parameter file is too large for transmission via a single GAS message as the 802.11 message and that the extant connection between the AP and the STA is encrypted:
        splitting the parameter file into multiple payloads; and
        transmitting each payload of the multiple payloads in a corresponding GAS message that includes an exchange ID that uniquely identifies a given payload of the multiple payloads.

12. The system of claim 8, wherein the operation further comprises:
    in response to determining that the parameter file is too large for transmission via a single GAS message as the 802.11 message:
        splitting configuration data into multiple payloads; and
        transmitting each payload of the multiple payloads in a corresponding GAS message that indicates a comeback response format.

13. The system of claim 8, wherein the parameter file replaces an earlier version of the parameter file in volatile memory of the STA.

14. The system of claim 8, wherein the operation further comprises, before initiating exchange of the parameter file:
    establishing a mutual exchange mechanism between the AP and the STA to indicate that the STA is capable of receiving new configuration data while remaining connected to the AP.

15. A memory storage device including instructions that when performed by a processor enable the processor to:
    initiate, based on a triggering network condition, an exchange of a parameter file via a Generic Advertisement Service (GAS) message, the parameter file being transferred between an access point (AP) and a station (STA) via an extant connection between the AP and the STA, wherein the parameter file excludes layer two information; and in response to determining that the exchange of the parameter file was successful, maintain the extant connection between the STA and the AP according to new configuration data included in the parameter file.

16. The memory storage device of claim 15, wherein the parameter file exchanged via the GAS message includes a reduced data set of a full parameter file that indicates the new configuration data and omits repeated configuration data.

17. The memory storage device of claim 15, wherein the instructions further enable the processor to:

initiate a second exchange of the new configuration data with a second GAS message between the AP to a second STA connected to the AP; and in response to determining that the exchange was unsuccessful, terminate a second extant connection between the AP and the second STA.

18. The memory storage device of claim 15, wherein the instructions further enable the processor to:

in response to determining that the parameter file is too large for transmission via a single GAS message and that the extant connection between the AP and the STA is encrypted:

split the parameter file into multiple payloads; and transmit each payload of the multiple payloads in a corresponding GAS message that includes an exchange ID that uniquely identifies a given payload of the multiple payloads.

19. The memory storage device of claim 15, wherein the instructions further enable the processor to:

in response to determining that the parameter file is too large for transmission via a single GAS message:

split the parameter file into multiple payloads; and transmit each payload of the multiple payloads in a corresponding GAS message that indicates a comeback response format.

20. The memory storage device of claim 15, wherein the instructions further enable the processor to, before initiating the exchange of the parameter file:

establish a mutual exchange mechanism between the AP and the STA to indicate that the STA is capable of receiving the new configuration data while remaining connected to the AP.

* * * * *